US012114638B2

(12) United States Patent
Oscarsson

(10) Patent No.: US 12,114,638 B2
(45) Date of Patent: Oct. 15, 2024

(54) SYSTEM AND METHOD FOR PROVIDING A DECISION BASIS FOR CONTROLLING A ROBOTIC ARM, COMPUTER PROGRAM AND NON-VOLATILE DATA CARRIER

(71) Applicant: DELAVAL HOLDING AB, Tumba (SE)

(72) Inventor: Erik Oscarsson, Tumba (SE)

(73) Assignee: DeLaval Holding AB, Tumba (SE)

( * ) Notice: Subject to any disclaimer, the term of this patent is extended or adjusted under 35 U.S.C. 154(b) by 439 days.

(21) Appl. No.: 17/610,875

(22) PCT Filed: May 6, 2020

(86) PCT No.: PCT/SE2020/050459
§ 371 (c)(1),
(2) Date: Nov. 12, 2021

(87) PCT Pub. No.: WO2020/231312
PCT Pub. Date: Nov. 19, 2020

(65) Prior Publication Data
US 2022/0210997 A1  Jul. 7, 2022

(30) Foreign Application Priority Data
May 14, 2019  (SE) .................................. 1950570-0

(51) Int. Cl.
*A01J 5/017*  (2006.01)
*B25J 9/16*  (2006.01)
(Continued)

(52) U.S. Cl.
CPC ........... *A01J 5/0175* (2013.01); *B25J 9/1697* (2013.01); *G06T 7/248* (2017.01); *G06T 7/74* (2017.01)

(58) Field of Classification Search
CPC . G06T 7/248; G06T 7/74; B25J 9/1697; A01J 5/0175
(Continued)

(56) References Cited

U.S. PATENT DOCUMENTS 10,104,863 B1  10/2018  Henry et al.
2009/0271033 A1  10/2009  Van Der Tol et al.
(Continued)

FOREIGN PATENT DOCUMENTS

WO  2010/031632  3/2010
WO  2010/046669  4/2010
(Continued)

OTHER PUBLICATIONS

International Search Report for PCT/SE2020/050459 mailed Jun. 29, 2020, 5 pages.
(Continued)

*Primary Examiner* — Michael Robert Cammarata
*Assistant Examiner* — Pardis Sohraby
(74) *Attorney, Agent, or Firm* — NIXON & VANDERHYE

(57) ABSTRACT

A system and method for providing a decision basis for controlling a robotic arm to perform at least one action relating to a milk-producing animal, wherein a camera registers three-dimensional image data of a milking location that includes a reference object and a rotating platform upon which an animal stands with its hind legs facing the camera, and a control unit checks if an entry window for a robotic arm can be found in the image data by searching for the reference object in the image data, and if the reference object is found the control unit searches for an acceptable obstacle-free volume in the image data, this volume being located within an allowed space relative to the reference object.

29 Claims, 2 Drawing Sheets

(51) Int. Cl.
*G06T 7/246* (2017.01)
*G06T 7/73* (2017.01)

(58) Field of Classification Search
USPC .......................................................... 382/153
See application file for complete search history.

(56) References Cited

U.S. PATENT DOCUMENTS

| | | | |
|---|---|---|---|
| 2010/0199915 A1 | 8/2010 | Pettersson et al. | |
| 2010/0289649 A1* | 11/2010 | Holmgren | A01J 5/0175 119/14.08 |
| 2012/0275660 A1 | 11/2012 | Hofman et al. | |
| 2014/0331934 A1* | 11/2014 | Eriksson | A01K 1/12 119/14.04 |
| 2015/0366156 A1* | 12/2015 | Holmström | A01J 7/04 119/650 |
| 2016/0120143 A1* | 5/2016 | Hofman | A01J 5/007 119/14.08 |
| 2017/0035017 A1* | 2/2017 | Hofman | A01J 5/007 |
| 2018/0049389 A1 | 2/2018 | Foresman et al. | |
| 2018/0049392 A1 | 2/2018 | Foresman et al. | |
| 2018/0049396 A1 | 2/2018 | Foresman et al. | |
| 2018/0343823 A1 | 12/2018 | Wisse et al. | |
| 2019/0188820 A1* | 6/2019 | Foresman | A01J 5/0175 |

FOREIGN PATENT DOCUMENTS

| | | |
|---|---|---|
| WO | 2012/149075 | 11/2012 |
| WO | 2014/014341 | 1/2014 |

OTHER PUBLICATIONS

Written Opinion of the ISA for PCT/SE2020/050459 mailed Jun. 29, 2020, 6 pages.
Swedish Search Report for SE1950570-0 mailed Nov. 26, 2019, 3 pages.
Office Action issued in Chinese Patent Application No. 202080036054.7 dated Mar. 24, 2023.

* cited by examiner

SYSTEM AND METHOD FOR PROVIDING A DECISION BASIS FOR CONTROLLING A ROBOTIC ARM, COMPUTER PROGRAM AND NON-VOLATILE DATA CARRIER

This application is the U.S. national phase of International Application No. PCT/SE2020/050459 filed May 6, 2020 which designated the U.S. and claims priority to SE Patent Application No. 1950570-0 filed May 14, 2019, the entire contents of each of which are hereby incorporated by reference.

TECHNICAL FIELD

The present invention relates generally to automatic milking of animals. In particular, the invention relates to a system for providing a decision basis for controlling a robotic arm to perform at least one action relating to a milk-producing animal, and a corresponding method. The invention also relates to a computer program implementing the method and a non-volatile data carrier storing the computer program.

BACKGROUND

Today's automatic milking arrangements are highly complex installations. This is particularly true in scenarios where the milking procedure is handled in a fully automated manner by means of one or more milking robots that serve a number of milking stations. In such a case, the milking robot attaches teatcups and other tools, e.g. cleaning cups, to the animals without any human interaction. Of course, it is crucial that the movements of the milking robot's arm do not cause any injuries to the animals. To this aim, when controlling the robot arm, the milking robot must be provided with a reliable decision basis.

WO 2010/046669 describes a milking apparatus comprising sensor apparatus that is operative, in use of the milking apparatus, to determine a location in a lateral direction with respect to an animal of at least one anatomical feature of the animal, which at least one anatomical feature is something other than an udder of the animal. The sensor apparatus comprises image capture apparatus that is operative to acquire at least one image of at least part of the animal. The milking apparatus also comprises a robot arm located, in use of the milking apparatus, either behind or in front of the animal. The robot arm is operative to move towards the udder in dependence upon the determined location of the anatomical feature.

This apparatus may be useful. However, the data quality of the captured images may not be sufficient to provide a decision basis that can be fully relied upon when controlling a robotic arm in close proximity to the animal.

SUMMARY

The object of the present invention is therefore to provide an enhanced decision basis for automatic control of a robotic arm to perform actions relating to milk-producing animals in an efficient manner.

According to one aspect of the invention, the object is achieved by a system for providing a decision basis for controlling a robotic arm to perform at least one action relating to a milk-producing animal. The system includes a camera and a control unit. The camera is configured to register three-dimensional (3D) image data representing a milking location, which, in turn, contains a rotating platform upon which said animal is standing with its hind legs facing the camera. The control unit is configured to receive the image data from the camera, and process the image data to derive the decision basis, e.g. indicate whether or not it is suitable to control the robotic arm to perform said at least one action. The milking location contains a reference object, for example in the form of a physical entity, or a part of a physical entity, that extends laterally in parallel with a plane of rotation for the rotating platform. Specifically, the control unit's processing of the image data involves checking if an entry window for the robotic arm can be found in the image data. The checking, in turn, involves searching for the reference object in the image data; and if the reference object is found, searching for an acceptable obstacle-free volume in the image data. The obstacle-free volume is located within an allowed space relative to the reference object, contains a continuous area facing the camera which continuous area exceeds a threshold size. Further, the obstacle-free volume starts at a predefined position and extends at least a primary distance in a depth direction away from the camera.

This system is advantageous because it defines a well-defined space in which the robotic arm can operate in a safe manner, provided that this space is available. Moreover, the well-defined space is represented by a comparatively small subset of the 3D image data. Thus, a high degree of reliability can be combined with high data processing efficiency.

According to one embodiment of this aspect of the invention, if the reference object cannot be found in the image data, the checking involves obtaining information about the reference object from stored image data that represent the milking location, which stored data were registered by the camera at an earlier occasion when the milking location was positioned in front of the camera. Consequently, even if the reference object is temporarily obscured, the proposed checking for an entry window can be effected.

According to another embodiment of this aspect of the invention, the reference object contains a physical entity, or a part of a physical entity, that extends laterally in parallel with a plane of rotation for the rotating platform. Thus, the reference object may be any kind of stalling equipment located on, or adjacent to, the rotating platform, e.g. a post, a pole, a railing or a railing support.

The camera is preferably arranged at such a position, orientation and with such a field of view that, in a lateral direction, the registered 3D image data includes a width of at least one milking stall. In a longitudinal direction, the registered 3D image data includes the allowed space and the reference object. The reference object extends at least across a central part of the field of view in the lateral direction. Preferably, the reference object extends across the entire width of the image data. As a result, the reference object is readily usable as a starting point for navigation in the 3D image data.

The reference object may form part of structure arranged on a stationary part of the milking location separate from the rotating platform, and which structure is configured to prevent the hind legs from reaching outside of a safety zone for the milking location. Thus, a so-called kick rail can be used as a reference object. This is advantageous, since the kick rail is a clearly distinguishable object located at a distinct distance from the camera; in other words, an ideal reference object.

Preferably, if the control unit has found the acceptable obstacle-free volume in the image data, the control unit is further configured to check if one or more of the contours that delimit the continuous area fulfill at least one shape requirement. For example, such shape requirements may relate to a maximally acceptable degree of jaggedness and/or a maximally acceptable degree of irregularity of the continuous area. If each of the at least one shape requirement is fulfilled, the control unit is configured to classify said volume as the entry window for the robotic arm. This means that it is considered safe to control the robotic arm under the animal via the entry window.

If the control unit has found the acceptable obstacle-free volume in the image data, according to one embodiment of this aspect of the invention, the control unit is further configured to search for an udder of the animal in the allowed space of the image data. Here, the control unit uses the reference object as a first boundary condition and the rotating platform as a second boundary condition for the search. Thereby, the search space is adequately delimited. This, in turn, enables the search procedure to be completed efficiently.

Preferably, the searching for said volume involves filtering out information in the image data, which information represents objects located closer to the camera than a first threshold distance and farther away from the camera than a second threshold distance. The first and second threshold distances are separated from one another by the primary distance. This further delimits the search space, and thus increases the efficiency of the search procedure even further.

The predefined position may be located at the first threshold distance from the camera, and according to one embodiment of the invention, the first threshold distance is zero, i.e. the primary distance starts already at the camera. Namely, the animal is often located relatively close to the camera. Therefore, the search space may need to start at the camera's front lens. The far end of the primary distance may be defined in relation to at least one measure of the rotating platform, for example a particular distance away from the edge of the platform being closest to the camera corresponding to a typical range of operation for the robotic arm.

According to one further embodiment of this aspect of the invention, the searching for said volume involves filtering out information in the image data, which information represents intensities of light outside of an acceptable range of intensity. In other words, the search space is delimited on other grounds than distance relationships. However, the light intensity is typically correlated with distance, i.e. a relatively low light intensity is often associated with object surfaces comparatively far away, and vice versa. Of course, a remote and very brightly colored object may result in image data of higher intensity than a very dark object located close to the camera.

According to an additional embodiment of this aspect of the invention, it is presumed that the milking location contains at least one auxiliary reference object whose position is known relative to the position of the camera. Here, the control unit is further configured to search for the at least one auxiliary reference object in the image data when performing the checking if the entry window can be found. Namely, thereby the entry window can be positioned very accurately. This, in turn, improves the quality of the provided decision support.

According to another aspect of the invention, the object is achieved by a method of providing a decision basis for controlling a robotic arm to perform at least one action relating to a milk-producing animal. The method involves registering, via a camera, 3D image data representing a milking location. The milking location, in turn, contains a rotating platform upon which the animal is standing with its hind legs facing the camera. The method further involves processing the image data to derive the decision basis, e.g. indicating whether or not it is suitable to control the robotic arm to perform the at least one action. The milking location contains a reference object, and the method specifically involves performing a checking if an entry window for the robotic arm can be found in the image data. The checking, in turn, involves searching for the reference object in the image data. If the reference object is found, an acceptable obstacle-free volume is searched for in the image data. The obstacle-free volume is located within an allowed space relative to the reference object, and contains a continuous area facing the camera, which continuous area exceeds a threshold size. The obstacle-free volume starts at a predefined position and extends at least a primary distance in a depth direction away from the camera. The advantages of this method, as well as the preferred embodiments thereof, are apparent from the discussion above with reference to the system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
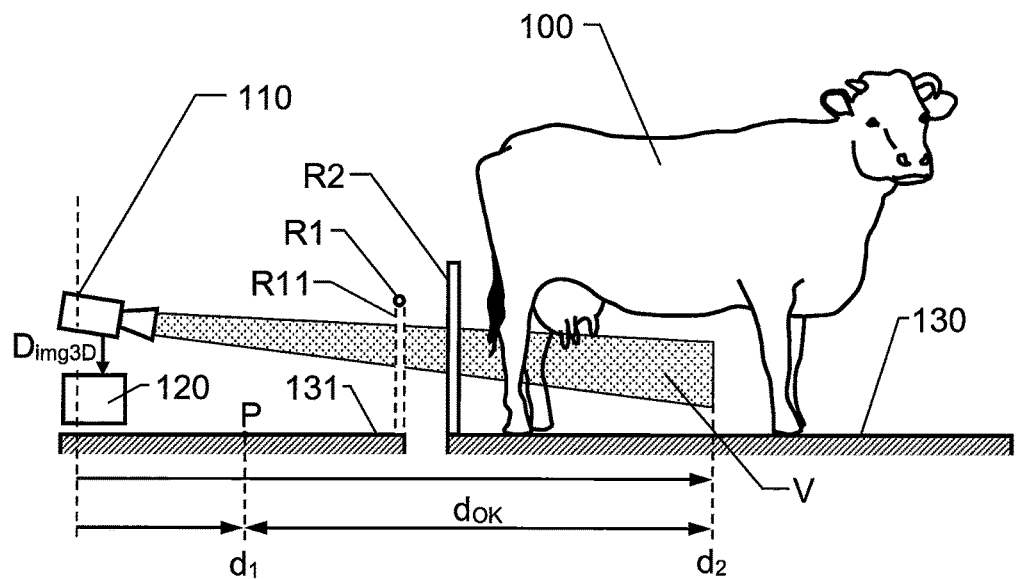
FIG. 1 shows a side view of a milk-producing animal and a system according to one embodiment the invention.

In FIG. 1, we see a side view of a milk-producing animal 100. FIG. 1 also schematically illustrates one embodiment of the system according to the invention. The system provides a decision basis DB for controlling a robotic arm (not shown) to perform at least one action relating to the animal 100, such as executing pre- and/or post-milking teat disinfection, attaching and/or detaching teatcups. The decision basis DB may indicate a simple "yes" or "no" regarding whether or not it is suitable to control the robotic arm under the animal 100. However, in the affirmative case, the decision basis DB may further include data defining spatial coordinates for an acceptable obstacle free-volume under the animal 100.

The system contains a camera 110 and a control unit 120. The camera 110 is configured to register 3D image data $D_{img3D}$. Preferably, the camera 110 is a time-of-flight (ToF) camera, i.e. range imaging camera system that resolves distance based on the known speed of light. According to the invention, however, the camera 110 may be any alternative imaging system capable of determining the respective distances to the objects being imaged, for example a 2D camera emitting structured light or a combined light detection and ranging (LIDAR) camera system. The 3D image data $D_{img3D}$ represents a milking location that includes a rotating platform 130 upon which the animal 100 is standing with its hind legs facing the camera 110. The control unit 120 is configured to receive the 3D image data $D_{img3D}$ from the camera 110, and process the 3D image data $D_{img3D}$ to derive the decision basis DB. The decision basis DB may for example indicate whether or not it is suitable to control the robotic arm to perform said at least one action.

Figure 2:
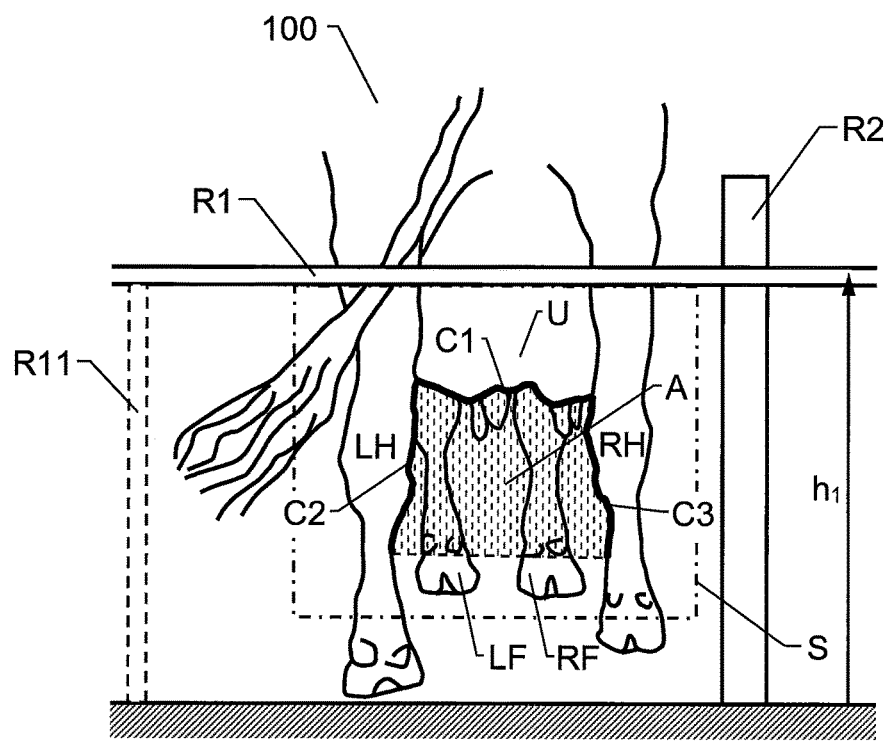
FIG. 2 illustrates a field of view of the animal in FIG. 1 as seen from the system's camera.

FIG. 2 illustrates a field of view of the animal 100 in FIG. 1 as seen from the camera 110. Due to the animal's 100 positioning on the rotating platform 130 and the camera's 110 location, the animal's 100 hind legs LH and RH respectively are closer to the camera 110 than the animal's 100 front legs LF and RF respectively. Therefore, the latter appear to be smaller in the 3D image data $D_{img3D}$. More important, the fact that the front legs LF and RF are more remote than the hind legs LH and RH is, of course, reflected by distance information in the 3D image data $D_{img3D}$, which distance information is associated with the pixels representing said legs.

Preferably, to obtain an adequate view angle, the camera 110 is arranged at a distance 0.6 m to 1.0 m away from the animal's 100 hind legs hind legs LH and RH. Namely, at such a distance and using typical optics, the view angle covers the full width of one milking stall plus at least 20% of the width of a neighboring stall. More preferably, the view angle covers at least the width of one and a half milking stall. Namely, thereby there is a high probability that a visual pattern, which repeats itself from one stall to another is visible in the same view. This, in turn, is advantageous when controlling the robotic arm to perform various actions relating to the milk-producing animals on the rotating platform 130 because knowledge of such repeating patterns increases the reliability with which the robotic arm can navigate on the rotating platform 130.

The milking location also contains at least one reference object being clearly distinguishable by the camera 110, and is positioned at a distinct distance from the camera 110. For example, the reference object may be represented by a kick rail R1, i.e. a generally horizontally oriented structure that is stationary and configured to prevent the hind legs LH and RH from reaching outside of a safety zone for the milking location. Thus, the reference object may be separate from the rotating platform 130. However, additionally or alternatively, the milking location may also contain reference objects on the rotating platform 130, i.e. other objects whose position preferably is known relative to the position of the camera 110, such as a generally vertically oriented object in the form of a pole R2, or similar structure adjoining a milking stall, and/or a cabinet for holding milking equipment. Additionally or alternatively, the reference object may be a stationary structure outside the rotating platform, for instance a pole R11 supporting the kick rail R1.

The control unit 120 is configured to perform a checking if an entry window for the robotic arm can be found in the 3D image data $D_{img3D}$. The checking involves searching for the reference object R1, R11 and/or R2 in the 3D image data $D_{img3D}$. If the reference object is found, the control unit 120 is configured to search for an acceptable obstacle-free volume V in the 3D image data $D_{img3D}$. The acceptable obstacle-free volume V is located within an allowed space S relative to the reference object, for example below the kick rail R1. The acceptable obstacle-free volume V shall also have a continuous area A facing the camera 110, which continuous area A exceeds a threshold size. The threshold size is set depending on the physical characteristics of the robotic arm, such as its size measures and its degrees of freedom. The acceptable obstacle-free volume V starts at a predefined position P and extends at least a primary distance $d_{OK}$ in a depth direction away from the camera 110.

If the control unit 120 cannot find the reference object R1, R11 and/or R2 in the image data $D_{img3D}$, for instance because the reference object is temporarily obscured, the control unit 120 is preferably configured to obtain information about the reference object from stored 3D image data $D_{img3D}$ representing the milking location. The stored 3D image data $D_{img3D}$ reflect the same milking location, and have been registered by the camera 110 at an earlier occasion when this milking location was positioned in front of the camera 110.

According to one embodiment of the invention, the reference object R1 contains a physical entity, or a part of a physical entity, that extends laterally in parallel with a plane of rotation for the rotating platform 130. Further, in this embodiment, the camera 110 is arranged at such a position, orientation and with such a field of view that the registered 3D image data $D_{img3D}$, in a lateral direction, covers a width of at least one milking stall. In a longitudinal direction, the registered 3D image data $D_{img3D}$ covers the allowed space S and the reference object R1, R11 and/or R2. The reference object R1, R11 and/or R2 extends across a central part of the field of view in the lateral direction, say at least 50% of the full width. Preferably, the reference object R1, R11 and/or R2 extends across the full width of the registered 3D image data $D_{img3D}$. This would typically be true for a reference object in the form of a kick rail R1, which, in most cases, surrounds the entire rotatable platform 130.

If the control unit 120 has found the acceptable obstacle-free volume V in the 3D image data $D_{img3D}$, the control unit 120 is preferably further configured to check if at least one contour that delimits the continuous area A fulfills at least one shape requirement. FIG. 2 exemplifies three contours C1, C2, and C3 delimiting the continuous area A upwards, to the left and to the right via an inner side of the left hind leg LH, a lower surface of an udder U and an inner side of the right hind leg RH respectively.

A first shape requirement may be that the at least one contour C1, C2, and/or C3 has a maximally acceptable degree of jaggedness. Here, an excessively jagged contour is regarded to provide an unreliable decision basis DB. Therefore, in such a case, it is deemed unsafe to control the robotic arm under the animal 100. A second shape requirement may be that at least one contour C1, C2, and/or C3 defines a maximally acceptable degree of irregularity of the continuous area A. Also in such a case, a highly irregular continuous area A is regarded to provide an unreliable decision basis DB. Consequently, if the maximally acceptable degree of irregularity is exceeded, the robotic arm is prevented from being controlled under the animal 100. However, if each of the at least one shape requirement is fulfilled, the control unit 120 is configured to classify said volume V as the entry window for the robotic arm.

According to one embodiment of the invention, if the control unit 120 has found the acceptable obstacle-free volume V in the 3D image data $D_{img3D}$, the control unit 120 is further configured to search for the udder U of the animal 100 in the allowed space S of the 3D image data $D_{img3D}$. Here, the control unit 120 uses the reference object, e.g. R1, as a first boundary condition. The control unit 120 may also use the rotating platform 130 as a second boundary condition for the search. Thus, the search space is adequately delimited, which, in turn, results in that the search can be completed comparatively quickly.

In order to further reduce the processing load on the control unit 120 to complete the search, the searching for the acceptable obstacle-free volume V may involve filtering out information in the 3D image data $D_{img3D}$, which information represents objects located closer to the camera 110 than a first threshold distance $d_1$ and farther away from the camera 110 than a second threshold distance $d_2$. The first and second threshold distances $d_1$ and $d_2$ respectively are separated from one another by the above-mentioned primary distance $d_{OK}$.

The primary distance $d_{OK}$ is preferably defined in relation to at least one measure of the rotating platform 130, for instance in the form of first and second sub distances, where the first sub distance is measured on a stationary side of the milking location from the outer edge of the rotating platform 130, and the second sub distance is measured on the rotating platform 130 from the outer edge towards the center thereof.

The predefined position P at which the acceptable obstacle-free volume V starts may be located at the first threshold distance $d_1$ from the camera 110 as illustrated in FIG. 1. According to one preferable embodiment of the invention, the first threshold distance $d_1$ is zero, i.e. the volume V starts at the front lens of the camera 110. Namely, in many milking installations, the animal 100 can be located close to the camera 110. In such cases, it is relevant for the volume V to extend all the way up to the camera 110.

The search space may further be limited by filtering out information in the 3D image data $D_{img3D}$, which information represents intensities of light outside of an acceptable range of intensity. Namely, excessively bright or dark pixels do not provide a reliable decision basis anyway.

Figure 3:
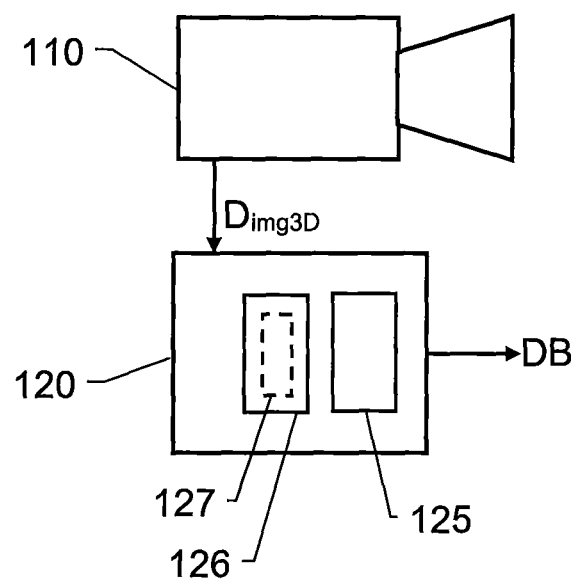
FIG. 3 shows a block diagram over the system according to the invention.

FIG. 3 shows a block diagram over the system according to the invention. It is generally advantageous if the control unit 120 and the camera 110 are configured to effect the above-described procedure in an automatic manner by executing a computer program 127. Therefore, the control unit 120 may include a memory unit 126, i.e. non-volatile data carrier, storing the computer program 127, which, in turn, contains software for making processing circuitry in the form of at least one processor in the central control unit 120 execute the above-described actions when the computer program 127 is run on the at least one processor.

Figure 4:
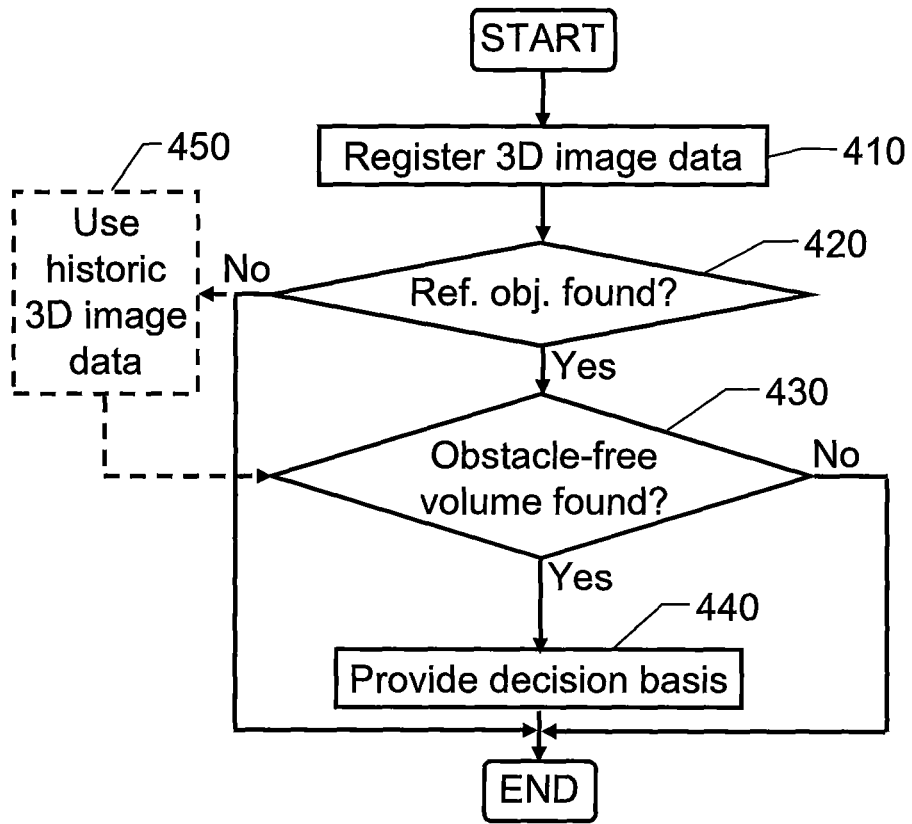
FIG. 4 illustrates, by means of a flow diagram, the general method according to the invention.

In order to sum up, and with reference to the flow diagram in FIG. 4, we will now describe the general method according to the invention of providing a decision basis for controlling a robotic arm to perform at least one action relating to a milk-producing animal. More precisely, the decision basis may indicate whether or not it is suitable to control the robotic arm to perform the at least one action.

In a first step 410, 3D image data are registered via a camera. The 3D image data represent a milking location containing a rotating platform upon which animal is standing with its hind legs facing the camera.

Then, in a step 420, the 3D image data are processed by searching for a reference object at the milking location. If the reference object is found, a step 430 follows. Otherwise, the procedure ends.

In step 430, it is checked if an entry window for the robotic arm can be found in the image data. The checking, in turn, involves searching for an acceptable obstacle-free volume in the image data. This volume is located within an allowed space relative to the reference object; contains a continuous area facing the camera, which continuous area exceeds a threshold size; starts at a predefined position; and extends at least a primary distance in a depth direction away from the camera. If the obstacle-free volume is found, a step 440 follows, and otherwise, the procedure ends.

In step 440, the decision basis is provided, inter alia indicating a suitability to control the robotic arm to perform the at least one action relating to the milk-producing animal.

According to one preferred embodiment of the invention, if the reference object cannot be found in the image data, a step 450 follows. Here, information about the reference object is obtained from stored image data representing the milking location. Thereafter, the procedure continues to step 430 above.

All of the process steps, as well as any sub-sequence of steps, described with reference to FIG. 4 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for controlling a robotic arm to perform at least one action relating to a milk-producing animal (100), the system comprising:
   a camera (110) configured to register three-dimensional image data ($D_{img3D}$) representing a milking location comprising a rotating platform (130) that receives said animal (100) such that the animal stands with its hind legs (LH, RH) facing the camera (110); and
   a control unit (120) comprising at least one processor and a memory unit, the memory unit having stored therein instructions that, when executed by the processor, cause the processor to receive the image data ($D_{img3D}$) from the camera (110), process the image data ($D_{img3D}$), and control the robotic arm, wherein the milking location also comprises a reference object (R1) that forms part of a structure arranged on a stationary part (131) of the milking location separate from the rotating platform (130), said structure being configured to prevent the hind legs (LH, RH) from reaching outside of a safety zone for the milking location, and wherein the at least one processor in the control unit (120) is programmed to:

determine whether an entry window for the robotic arm is in the image data ($D_{img3D}$) by first searching for the reference object (R1) in the image data ($D_{img3D}$), if the reference object (R1) is found in the image data ($D_{img3D}$), search for an acceptable obstacle-free volume (V) in the image data ($D_{img3D}$), where said acceptable obstacle-free volume (V) is defined as:

being located within an allowed space (S) relative to the reference object (R1), comprising a continuous area (A) that faces the camera (110) and exceeds a threshold size, and starting at a predefined position (P) and extending at least a primary distance ($d_{OK}$) in a depth direction away from the camera (110), and if the acceptable obstacle-free volume (V) is found in the image data ($D_{img3D}$), control the robotic arm to perform at least one action relating to a milk-producing animal (100).

2. The system according to claim 1, wherein the at least one processor in the control unit (120) is further programmed so that if the reference object (R1) is not found in the image data ($D_{img3D}$), the at least one processor obtains information about the reference object (R1) from stored image data ($D_{img3D}$) representing the milking location, said stored image data ($D_{img3D}$) registered by the camera (110) at an earlier occasion when the milking location was positioned in front of the camera (110).

3. The system according to claim 1, wherein:

the reference object (R1) comprises at least a part of a physical entity extending laterally in parallel with a plane of rotation for the rotating platform (130);

the camera (110) is arranged with each of a position, an orientation, and a field of view such that the three-dimensional image data ($D_{img3D}$), in a lateral direction, comprises a width of at least one milking stall and, in a longitudinal direction, comprises the allowed space (S) and the reference object (R1); and the reference object (R1) extends across a central part of the field of view in the lateral direction.

4. The system according to claim 1, wherein, upon said second searching finding the acceptable obstacle-free volume (V) in the image data ($D_{img3D}$), the at least one processor of the control unit (120) is programmed to:

check whether at least one contour (C1, C2, C3) delimiting the continuous area (A) fulfills at least one shape requirement, and upon fulfilling the at least one shape requirement, classify said acceptable obstacle-free volume (V) as the entry window for the robotic arm.

5. The system according to claim 4, wherein, upon said second searching finding the acceptable obstacle-free volume (V) in the image data ($D_{img3D}$), the at least one processor of the control unit (120) is programmed to:

search for an udder (U) of said animal (100) in the allowed space (S) of the image data ($D_{img3D}$) using the reference object (R1) as a first boundary condition and using the rotating platform (130) as a second boundary condition.

6. The system according to claim 4, wherein a first shape requirement of the at least one shape requirement defines a maximally acceptable degree of jaggedness of the at least one contour (C1, C2, C3).

7. The system according to claim 6, wherein a second shape requirement of the at least one shape requirement defines a maximally acceptable degree of irregularity of the continuous area (A).

8. The system according to claim 4, wherein a first shape requirement of the at least one shape requirement defines a maximally acceptable degree of irregularity of the continuous area (A).

9. The system according to claim 1, wherein the searching for said acceptable obstacle-free volume (V) comprises filtering out information in the image data ($D_{img3D}$) which information represents objects located closer to the camera (110) than a first threshold distance ($d_1$) and farther away from the camera (110) than a second threshold distance ($d_2$), the first and second threshold distances ($d_1$, $d_2$) being separated from one another by the primary distance ($d_{OK}$).

10. The system according to claim 9, wherein the predefined position (P) is located at the first threshold distance ($d_1$) from the camera (110).

11. The system according to claim 10, wherein the first threshold distance ($d_1$) is zero.

12. The system according to claim 1, wherein the primary distance ($d_{OK}$) is defined in relation to at least one measure of the rotating platform (130).

13. The system according to claim 1, wherein the searching for said acceptable obstacle-free volume (V) comprises filtering out information in the image data ($D_{img3D}$), said information representing intensities of light outside of an acceptable range of intensity.

14. The system according to claim 1, wherein the milking location further comprises at least one auxiliary reference object (R11, R2) of the milking location whose position is known relative to the position of the camera (110), and the at least one processor in the control unit (120) is programmed to search for the at least one auxiliary reference object (R11, R2) in the image data ($D_{img3D}$) when performing the checking as to whether the entry window is in the image data ($D_{img3D}$).

15. A method for controlling a robotic arm to perform at least one action relating to a milk-producing animal (100), the method comprising:

registering, via a camera (110), three-dimensional image data ($D_{img3D}$) representing a milking location comprising a rotating platform (130) that receives said animal (100) such that the animal stands with its hind legs (LH, RH) facing the camera (110), the milking location also comprising a reference object (R1) that forms part of a structure arranged on a stationary part (131) of the milking location separate from the rotating platform (130), said structure being configured to prevent the hind legs (LH, RH) from reaching outside of a safety zone for the milking location;

determining whether an entry window for the robotic arm is in the image data ($D_{img3D}$) by first searching for the reference object (R1) in the image data ($D_{img3D}$), if the reference object (R1) is found in the image data ($D_{img3D}$), searching for an acceptable obstacle-free volume (V) in the image data ($D_{img3D}$), where said acceptable obstacle-free volume (V) is defined as:

being located within an allowed space (S) relative to the reference object (R1), comprising a continuous area (A) that faces the camera (110) and exceeds a threshold size,
starting at a predefined position (P) and extending at least a primary distance ($d_{OK}$) in a depth direction away from the camera (110), and
if the acceptable obstacle-free volume (V) is found in the image data ($D_{img3D}$), controlling the robotic arm to perform at least one action relating to a milk-producing animal (100).

16. The method according to claim 15, wherein, when said first searching does not find the reference object (R1) in the image data ($D_{img3D}$), the checking proceeds with:
obtaining information about the reference object (R1) from stored image data ($D_{img3D}$) representing the milking location, said stored image data ($D_{img3D}$) registered by the camera (110) at an earlier occasion when the milking location was positioned in front of the camera (110).

17. The method according to claim 16, wherein the searching for said acceptable obstacle-free volume (V) comprises filtering out information in the image data ($D_{img3D}$) which information represents objects located closer to the camera (110) than a first threshold distance ($d_1$) and farther away from the camera (110) than a second threshold distance ($d_2$), the first and second threshold distances ($d_1$, $d_2$) being separated from one another by the primary distance ($d_{OK}$).

18. The method according to claim 17, wherein the predefined position (P) is located at the first threshold distance ($d_1$).

19. The method according to claim 18, wherein the first threshold distance ($d_1$) is zero.

20. The method according to claim 16, wherein the primary distance ($d_{OK}$) is defined in relation to at least one measure of the rotating platform (130).

21. The method according to claim 16, wherein the searching for said acceptable obstacle-free volume (V) comprises filtering out in-formation in the image data ($D_{img3D}$), said information representing intensities of light outside of an acceptable range of intensity.

22. The method according to claim 16,
wherein the milking location comprises at least one auxiliary reference object (R11, R2) of the milking location whose position is known relative to the position of the camera (110), and
the method further comprises:
searching for the at least one auxiliary reference object (R11, R2) in the image data ($D_{img3D}$) when performing the checking as to whether the entry window is in the image data ($D_{img3D}$).

23. A non-transitory computer-readable data recording medium having recorded thereon a computer program (127) comprising software that, upon execution by at least one processor, causes the at least one processor to execute the method according to claim 16.

24. The method according to claim 15, wherein:
the reference object (R1) comprises at least a part of a physical entity extending laterally in parallel with a plane of rotation for the rotating platform (130);
the three-dimensional image data ($D_{img3D}$) is registered from such a position, an orientation, and a field of view such that the three-dimensional image data ($D_{img3D}$), in a lateral direction, comprises a width of at least one milking stall and, in a longitudinal direction, comprises the allowed space (S) and the reference object (R1); and
the reference object (R1) extends across a central part of the field of view in the lateral direction.

25. The method according to claim 15, wherein, upon said searching finding the acceptable obstacle-free volume (V) in the image data ($D_{img3D}$), the method proceeds with:
checking whether at least one contour (C1, C2, C3) delimiting the continuous area (A) fulfills at least one shape requirement, and
upon fulfilling the at least one shape requirement, classifying said acceptable obstacle-free volume (V) as the entry window for the robotic arm.

26. The method according to claim 25, wherein, upon said searching finding the acceptable obstacle-free volume (V) in the image data ($D_{img3D}$), the method proceeds with:
searching for an udder (U) of said animal (100) in the allowed space (S) of the image data ($D_{img3D}$) using the reference object (R1) as a first boundary condition and using the rotating platform (130) as a second boundary condition.

27. The method according to claim 25, wherein a first shape requirement of the at least one shape requirement defines a maximally acceptable degree of jaggedness of the at least one contour (C1, C2, C3).

28. The method according to claim 25, wherein a first shape requirement of the at least one shape requirement defines a maximally acceptable degree of irregularity of the continuous area (A).

29. A system for controlling a robotic arm to perform at least one action relating to a milk-producing animal (100), the system comprising:
a camera (110) configured to register three-dimensional image data ($D_{img3D}$) representing a milking location comprising a rotating platform (130) that receives said animal (100) such that the animal stands with its hind legs (LH, RH) facing the camera (110); and
a control unit (120) comprising at least one processor and a memory unit, the memory unit having stored therein instructions that, when executed by the processor, cause the processor to receive the image data ($D_{img3D}$) from the camera (110), and process the image data ($D_{img3D}$) to derive the decision basis (DB),
wherein the milking location also comprises a reference object (R1) that forms part of a structure arranged on a stationary part (131) of the milking location separate from the rotating platform (130), said structure being configured to prevent the hind legs (LH, RH) from reaching outside of a safety zone for the milking location, and
wherein the at least one processor in the control unit (120) is programmed to:
determine whether an entry window for the robotic arm is in the image data ($D_{img3D}$) by first searching for the reference object (R1) in the image data ($D_{img3D}$),
if the reference object (R1) is found in the image data ($D_{img3D}$), searching for an acceptable obstacle-free volume (V) in the image data ($D_{img3D}$), where said acceptable obstacle-free volume (V) is defined as:
being located within an allowed space (S) relative to the reference object (R1),
comprising a continuous area (A) that faces the camera (110) and exceeds a threshold size,
starting at a predefined position (P) and extending at least a primary distance ($d_{OK}$) in a depth direction away from the camera (110), and if the acceptable obstacle-free volume (V) is found in the image data ($D_{img3D}$), controlling the robotic arm to perform at least one action relating to a milk-producing animal (100), wherein:
the reference object (R1) comprises at least a part of a physical entity extending laterally in parallel with a plane of rotation for the rotating platform (130);

the camera (110) is arranged with each of a position, an orientation, and a field of view such that the three-dimensional image data ($D_{img3D}$), in a lateral direction, comprises a width of at least one milking stall and, in a longitudinal direction, comprises the allowed space (S) and the reference object (R1); and the reference object (R1) extends across a central part of the field of view in the lateral direction.

* * * * *